United States Patent [19]

Rudelle

[11] Patent Number: 5,310,016

[45] Date of Patent: May 10, 1994

[54] ELECTRICAL DRIVING UNIT FOR ROLLING VEHICLES AND MOTOR VEHICLES PROVIDED WITH SUCH A UNIT

[76] Inventor: Leonce Rudelle, Puech D'Autenc, Andouque, 81350 Valderies, France

[21] Appl. No.: 879,344

[22] Filed: May 7, 1992

[30] Foreign Application Priority Data

May 23, 1991 [FR] France ............... 91-06257

[51] Int. Cl.$^5$ ............................................. B60K 1/00
[52] U.S. Cl. .................................... 180/65.1; 180/65.3; 180/65.4; 318/139; 318/268
[58] Field of Search ............. 180/65.1, 65.2, 65.3, 180/65.4, 65.6; 318/244, 245, 246, 139, 268; 388/826

[56] References Cited

U.S. PATENT DOCUMENTS

| | | | |
|---|---|---|---|
| 3,736,482 | 5/1973 | Brusaglino | 318/338 |
| 4,125,797 | 11/1978 | Bader et al. | 318/270 |
| 4,142,135 | 2/1979 | Fujita | 318/139 |
| 4,181,876 | 1/1980 | Kato et al. | 318/246 |
| 4,330,742 | 5/1982 | Reimers | 318/139 |

FOREIGN PATENT DOCUMENTS

| | | | |
|---|---|---|---|
| 758729 | 10/1956 | United Kingdom | 388/826 |
| 2727041 | 1/1979 | Fed. Rep. of Germany. | |
| 1216775 | 4/1960 | France. | |
| 1432348 | 4/1976 | United Kingdom. | |

Primary Examiner—Eric Culbreth
Attorney, Agent, or Firm—Paul and Paul

[57] ABSTRACT

The invention relates to an electrical driving unit for a rolling motor vehicle of the kind comprising an electrically motorized subassembly which is fed by a direct current supply subassembly and controlled by an electrically regulated control subassembly and is connected to the running carriage of the vehicle via a gear box, clutch and secondary transmission. This driving unit is remarkable in that the abovementioned electrically motorized subassembly is a motor called "compound" with a series excitation winding and a parallel excitation winding; both connected between said electrically motorized control subassembly and the direct current supply subassembly, which is comprised of a series of accumulator batteries. Applications of the invention include electrical propulsion of land motor vehicles.

7 Claims, 1 Drawing Sheet

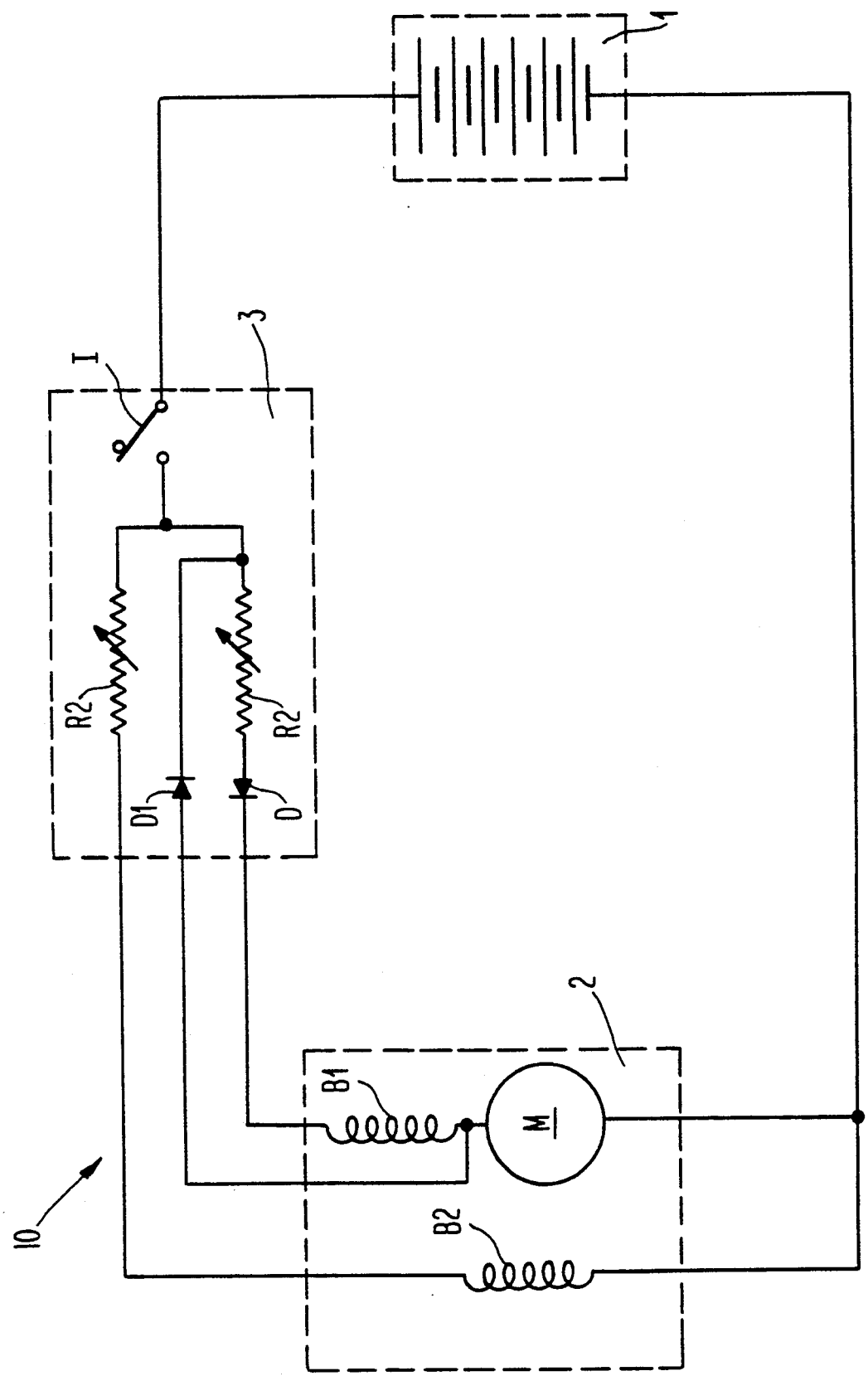

ELECTRICAL DRIVING UNIT FOR ROLLING VEHICLES AND MOTOR VEHICLES PROVIDED WITH SUCH A UNIT

BACKGROUND OF THE INVENTION

This invention relates to the field of automobiles, especially terrestrial, rolling vehicles driven by electricity. This invention pertains more specifically to the electrical driving unit required for the propulsion of a vehicle, of the kind that comprises an electrically motorized subassembly which, fed by a direct current supply subassembly, is connected to the running carriage via a gear box, a clutch and a secondary transmission.

Indeed, while developing the electrical driving unit for motor vehicles, the applicant has tried, above all, to maintain the flexability of steering in vehicles formerly equipped with a thermal motor especially to maintain the gear box, clutch and secondary transmission in place. Thus for obvious reasons of profitability, it is easy to integrate the electrical driving unit the invention, into a manufacturing line for conventional models of vehicles equipped with a thermal motor, since the advantages of this invention (silent operation, low energy consumption, easy maintenance, absence of pollution, etc.) have not been listed in these specifications because of their evident utility to the applicant. Problems with the thermal motor have already been raised by users and public authorities, over several decades now.

The electrical method for an independent drive in a motor vehicle suffers from many problems like:
relatively limited speed and propulsion power,
insufficient mass energy in batteries,
etc.

SUMMARY OF THE INVENTION

Based on these facts, the applicant therefore carried out research along two fundamental principles: simplicity of operation and adaptability to any motor vehicle. This research led in particular to an original design of the electrical driving unit for the propulsion of a motor vehicle, a driving unit of the kind comprising an electrically motorized subassembly controlled by an electrically regulated control subassembly and connected to the running carriage via the conventional mechanism -gear box-clutch-secondary transmission.

According to the fundamental concept of the machine, the invented electrical driving unit comprises an electrically motorized subassembly made up basically of a motor called "compound" with a series excitation winding and a parallel excitation winding, both connected between said electrically regulated control subassembly and the direct current supply subassembly, which is made up of a series of accumulator batteries. Such a "compound" motor provides a great advantage because it enables the progressive adapting of the driving torque to rotor speed during the start-up, acceleration, deceleration, braking and reverse phase of the fields generated by the stator owing to the series and parallel excitation windings. Besides, when the vehicle begins descending or decelerating or braking, and this at any rotor speed, the adoption of such a "compound" motor in the electrical driving unit of a motor vehicle has a great advantage of supplying a counter-electromotive force which enables the same motor to act as a current generator and ensure the reloading of the direct current supply subassembly accumulators.

According to an initial preferred embodiment of the invention, the abovementioned electrically regulated control subassembly comprises a first adjustable rheostat placed on the feed circuit of said series excitation winding enabling intensity variation and adjustment of said winding. This first adjustable rheostat allows a drop in voltage that ensures a flexible and progressive modulation of the rotor speed necessary in particular for the vehicle to start.

According to another preferred embodiment of the invention, the abovementioned electrically regulated control subassembly comprises a second adjustable rheostat placed on the feed circuit of the parallel excitation winding thus enabling intensity variation of said winding. The variation of this second adjustable rheostat ensures self-modulation by the torque and the rotor speed, especially after the starting phase operated by the first rheostat.

Of course, an electrical processing unit shall be carefully installed by a professional in the field in the electrically regulated control subassembly to control the two torques developed in both the series excitation winding and the parallel excitation winding automatically.

Even though the main aspects, regarded as new in the invention, have been explained above, further details regarding the preferred embodiment of an electrical driving unit for electrically driven vehicles complying with the fundamental concepts of the invention will be better understood by referring to the description given below and to the accompanying drawing illustrating this embodiment.

BRIEF DESCRIPTION OF THE DRAWING

The FIGURE in the drawing represents a form of electrical wiring for such an electrical driving unit.

DETAILED DESCRIPTION

As illustrated by this drawing, the electrical wiring pattern for an electrical driving unit generally referred to as 10 ensures the propulsion of a motor vehicle. For this reason, it comprises:
a direct current supply subassembly 1,
a motorization subassembly 2 intended to transform the direct current coming from the direct current supply subassembly 1 into mechanical energy which will be transmitted to the automobile running carriage,
a control subassembly 3 which, placed between the supply subassembly 1 and the motorization subassembly 2, is made up of an electrically adjustable control device for the two subassemblies 1 and 2.

The direct current supply subassembly 1 is made up in particular of a series of twenty 12-volt batteries which supply a 240-volt direct current output. A total of 20 accumulator batteries was arbitrarily decided by the applicant to initially supply the necessary power to the electrically motorized Subassembly 2 during the starting phase, while simultaneously ensuring greater operational autonomy of said subassembly during the post-startup phase.

The electrically motorized subassembly 2 comprises in particular an electrical motor M conventionally including a rotor whose output shaft is plugged onto the secondary transmission of the motor vehicle, whose rotor is revolved by a stator. A series excitation winding B1 and a parallel excitation winding B2 are connected to this stator, and make us a so-called "compound" motor, the first original feature of this invention. The series excitation winding B1 is connected to its input terminal in the electrically regulated control subassembly 3 and to its output terminal in the input terminal of the motor M. The parallel excitation winding B2 is connected at its input terminal to the electrically regulated control subassembly 3 and at its output terminal to the output terminal of the motor M; both these outputs are in turn connected to the direct current supply subassembly 1.

According to this invention, the electrically adjusted control device comprises two adjustable rheostats R1 and R2, the first of which is connected between the input terminal of the series excitation winding B1 and the supply subassembly 1, and the second between the input terminal of the parallel excitation winding B2 and the supply subassembly 1. The first rheostat R1 serves to cause a drop in voltage at the terminals of motor M, so as to reduce its rotor speed, during said motor vehicle startup stage, in order to obtain a flexible and progressive acceleration of the latter. As for the second rheostat B2, its role is to vary the intensity of the magnetic field generated by the parallel excitation winding B2 in order to self-modulate the torque of the motor M and its rotor speed, once the startup stage has been engaged.

An electric processing unit not represented on the drawing will be easily fitted by a professional in the field into the electrically regulated control subassembly 3 to carry out the automatic interconnection of the adjustments of the rheostats that are to combine the magnetic fields in the series excitation winding B1 and the parallel excitation winding B2, in order to adapt the torques and the rotor speed based on the load required by the transmission shaft of the motor vehicle according to the speed of the latter and to the slope of the track used.

According to an extremely advantageous feature of the invention, the abovementioned electrically regulated control subassembly 3 comprises two diodes D and D1 placed in a top to bottom, contiguous formation. The first diode D is placed between the series excitation winding B1 and the first rheostat R1, while the second diode D1 is placed on a circuit parallel to the one formed by the rheostat R1, the first diode D and the series excitation winding B1. This top to bottom, contiguous arrangement of the two diodes D and D1 has a great advantage in that it connects in parallel the rheostat R1 and the winding B1, as soon as the motor M supplies counter-electromotive force to supply a loading current to the accumulator batteries of the supply subassembly 1 when the motor runs faster because of the additional force of inertia supplied during the descending, decelerating and braking phases of the motor vehicle. Further, since the series excitation winding B1 is shunted during the production of electromotive power, de-energizing of said winding B1 and uncontrolled racing of the motor M are avoided.

The inputs of rheostats R1 and R2 are also connected together to the power supply source 1 via a switch I controlled manually by the driver, which serves the purpose of curing or re-establishing power in the electrical circuit for the entire electrical driving unit 10.

The operation of the electrical driving unit for motor vehicles as described above is as follows:

During the startup stage, the driver starts the motor by re-establishing the circuit in that he turns switch I, then acts upon the rheostat R1 to generate a magnetic field in the series excitation winding B1, which supplies progressively accelerated speed to the motor.

Once the motor M has started, the driver acts upon the rheostat R2 to modulate the intensity of the magnetic field inducted into the parallel excitation winding B2, which self-modulates with the magnetic current inducted into the series excitation winding B1, to increase or reduce the speed of the rotor R.

When the motor M produces a counter-electromotive force, the second diode D1 short-circuits the series excitation winding B1 and the first rheostat R1, so as to supply a loading current directly to the accumulators in the supply subassembly 1, while allowing the latter to maintain the necessary power and autonomy for the functioning of the entire motorized subassembly 2 of a motor vehicle.

It is understood that the reason for describing and representing an electrical driving unit 10 as given above was with a view to disclosure rather than restriction. Of course, various developments modifications and improvements can be made on the example given above, without however moving away from the scope of the invention taken in all its aspects and ideas in the widest sense of the term.

For a better understanding of the drawing, a list of references with their legends has been detailed below:

| | |
|---|---|
| 10 | Electrical driving unit |
| 1 | Electrical power supply subassemble |
| 2 | Electrically motorized subassembly |
| B1 | Series excitation winding of subassembly 2 |
| B2 | Parallel excitation winding of subassembly 2 |
| M | Motor with stator and rotor |
| 3 | Electrically regulated control subassembly |
| R1 | First adjustable rheostat |
| R2 | Second adjustable rheostat |
| D, D1 | Diodes arranged in a top to bottom, continguous manner |
| I | Switch |

I claim:
1. An electrical driving unit for rolling motor vehicles, the driving unit comprising an electrically motorized subassembly made up of a motor including a rotor having a speed, a series excitation winding and a parallel excitation winding, said motor being fed by a direct current supply subassembly and controlled by an electrically regulated control subassembly,
said electrical driving unit characterized in that:
the series excitation winding and the parallel excitation winding are both connected between the direct current supply subassembly and the electrically regulated control subassembly,
the direct current supply subassembly comprising a series of accumulator batteries, and
the electrically regulated control assembly comprising a feed circuit for said series excitation winding and a first rheostat installed on the feed circuit of said series excitation winding of the electrically motorized subassembly allowing for a drop in voltage at the terminals of said series excitation winding in order to modulate the rotor speed of the motor.
2. An electrical driving unit according to claim 1 wherein the electrically regulated control assembly further comprises a first diode and a second diode, the first diode being placed between the series excitation winding of the electrically motorized subassembly and the first rheostat, and the second diode being placed between in a circuit parallel to the circuit comprised of the first diode, the first rheostat, and the series excita- tion winding, the second diode providing a shunt for the first rheostat and the series excitation winding in order to allow loading current to pass directly to the battery accumulators of the direct current supply subassembly as soon as the electrically motorized subassembly provides a counter-electromotive force.

3. An electrical driving unit for rolling motor vehicles, the driving unit comprising an electrically motorized subassembly made up of a motor including a rotor having a speed, a series excitation winding and a parallel excitation winding, said motor being fed by a direct current supply subassembly and controlled by an electrically regulated control subassembly, said electrical driving unit characterized in that:
the series excitation winding and the parallel excitation winding are both connected between the direct current supply subassembly and the electrically regulated control subassembly;
the direct current subassembly comprising a series of accumulator batteries and,
the electrically regulated control assembly comprising
a feed circuit for the series excitation winding;
a first rheostat installed on the feed circuit of said series excitation winding of the electrically motorized subassembly allowing for a drop in voltage at the terminals of said series excitation winding in order to modulate the rotor speed of the motor;
a feed circuit for the parallel excitation winding; and
a second rheostat installed on the feed circuit of the parallel excitation winding of the motorized subassembly, allowing for a variation in the intensity of the magnetic field of said parallel excitation winding in order to modulate the driving torque and speed of the rotor of the motor after startup of the motor.

4. An electrical driving unit according to claim 3 wherein the electrically regulated control assembly further comprises a first diode and a second diode, the first diode being placed between the series excitation winding of the electrically motorized subassembly and the first rheostat, and the second diode being placed between in a circuit parallel to the circuit comprised of the first diode, the first rheostat, and the series excitation winding, the second diode providing a shunt for the first rheostat and the series excitation winding in order to allow loading current to pass directly to the battery accumulators of the direct current supply subassembly as soon as the electrically motorized subassembly provides a counter-electromotive force.

5. A motor vehicle provided with an electrical driving unit, the driving unit comprising an electrically motorized subassembly made up of a motor including a rotor having a speed, a series excitation winding and a parallel excitation winding, said motor being fed by a direct current supply subassembly and controlled by an electrically regulated control subassembly, said electrical driving unit characterized in that:
the series excitation winding and the parallel excitation winding are both connected between the direct current supply subassembly and the electrically regulated control subassembly,
the direct current supply subassembly comprising a series of accumulator batteries, and
the electrically regulated control assembly comprising a feed circuit for said series excitation winding and a first rheostat installed on the feed circuit of said series excitation winding of the electrically motorized subassembly allowing for a drop in voltage at the terminals of said series excitation winding in order to modulate the rotor speed of the motor.

6. A motor vehicle according to claim 5, the electrically regulated control assembly further comprising a feed circuit for the parallel excitation winding; and a second rheostat installed on the feed circuit of the parallel excitation winding of the motorized subassembly, allowing for a variation in the intensity of the magnetic field of said parallel excitation winding in order to modulate the driving torque and speed of the rotor of the motor after startup of the motor.

7. A motor vehicle according to claim 5, the electrically regulated control assembly further comprising a first diode and a second diode, the first diode being placed between the series excitation winding of the electrically motorized subassembly and the first rheostat, and the second diode being placed between in a circuit parallel to the circuit comprised of the first diode, the first rheostat, and the series excitation winding, the second diode providing a shunt for the first rheostat and the series excitation winding in order to allow loading current to pass directly to the battery accumulators of the direct current supply subassembly as soon as the electrically motorized subassembly provides a counter-electromotive force.

* * * * *